United States Patent
Lin et al.

(10) Patent No.: US 12,271,863 B2
(45) Date of Patent: Apr. 8, 2025

(54) MATERIAL INVENTORY COUNTING METHOD AND APPARATUS, WAREHOUSING ROBOT, AND WAREHOUSING SYSTEM

(71) Applicant: HAI ROBOTICS CO., LTD., Guangdong (CN)

(72) Inventors: Han Lin, Guangdong (CN); Lang Zhou, Guangdong (CN)

(73) Assignee: HAI ROBOTICS CO., LTD., Guangdong (CN)

( * ) Notice: Subject to any disclaimer, the term of this patent is extended or adjusted under 35 U.S.C. 154(b) by 253 days.

(21) Appl. No.: 18/145,239

(22) Filed: Dec. 22, 2022

(65) Prior Publication Data
US 2023/0131267 A1    Apr. 27, 2023

Related U.S. Application Data

(63) Continuation of application No. PCT/CN2021/099233, filed on Jun. 9, 2021.

(30) Foreign Application Priority Data

Jul. 2, 2020 (CN) .......................... 202010625414.9

(51) Int. Cl.
*G06Q 10/087* (2023.01)
*G06V 10/10* (2022.01)
(Continued)

(52) U.S. Cl.
CPC ........... *G06Q 10/087* (2013.01); *G06V 10/19* (2022.01); *G06V 20/60* (2022.01); *G06V 2201/07* (2022.01)

(58) Field of Classification Search
CPC .. G06Q 10/087; G06Q 10/0875; G06Q 10/10; G06V 10/19; G06V 20/60;
(Continued)

(56) References Cited

U.S. PATENT DOCUMENTS

| 7,693,757 B2 * | 4/2010 | Zimmerman | ........ G05D 1/0274 |
| | | | 705/28 |
| 8,447,863 B1 | 5/2013 | Francis et al. | |

(Continued)

FOREIGN PATENT DOCUMENTS

| CN | 108292381 A | 7/2018 |
| CN | 108960737 A | 12/2018 |

(Continued)

OTHER PUBLICATIONS

International Search Report for PCT/CN2021/099233 mailed Sep. 8, 2021.

(Continued)

*Primary Examiner* — Garcia Ade
(74) *Attorney, Agent, or Firm* — Frank Gao, Esq.

(57) ABSTRACT

Embodiments of the present disclosure provide a material inventory counting method and apparatus, a warehousing robot, and a warehousing system. The material inventory counting method is applied to the warehousing robot. The method includes: capturing an inventory counting image of a target box through the warehousing robot; and determining an inventory count of a material in the target box according to the inventory counting image. According to the technical solutions of the embodiments of the present disclosure, an inventory counting image of a target box is captured through a warehousing robot, and a count for a material in the target box is determined through image identification on the inventory counting image, to implement in-situ and automatic inventory counting for the material, without the need for cross-zone movement of the box, such that the efficiency of material inventory counting is greatly improved and the cost of inventory counting is lowered.

18 Claims, 6 Drawing Sheets

(51) Int. Cl.
*G06V 20/60* (2022.01)
*G06Q 10/10* (2023.01)

(58) Field of Classification Search
CPC ... G06V 2201/07; B25J 11/008; B25J 19/023; G06K 17/00; G06K 7/1408; G06K 19/06028; G06K 19/06037; G06T 1/0007; G06T 2207/30242
USPC .......................................................... 705/28
See application file for complete search history.

(56) References Cited

U.S. PATENT DOCUMENTS

| | | | |
|---|---|---|---|
| 10,071,856 B2 * | 9/2018 | Hance .................. | G05D 1/0234 |
| 2008/0077511 A1 | 3/2008 | Zimmerman | |
| 2018/0005173 A1 * | 1/2018 | Elazary .................. | B25J 13/085 |
| 2018/0029797 A1 | 2/2018 | Hance et al. | |
| 2018/0043547 A1 | 2/2018 | Hance et al. | |
| 2021/0032034 A1 * | 2/2021 | Kalouche ............... | B25J 9/1612 |

FOREIGN PATENT DOCUMENTS

| | | |
|---|---|---|
| CN | 109191044 A | 1/2019 |
| CN | 109264275 A | 1/2019 |
| CN | 109383966 A | 2/2019 |
| CN | 109592280 A | 4/2019 |
| CN | 109607031 A | 4/2019 |
| CN | 110039543 A | 7/2019 |
| CN | 110450176 A | 11/2019 |
| CN | 110532978 A | 12/2019 |
| CN | 110677174 A | 1/2020 |
| CN | 111260280 A | 6/2020 |
| CN | 111767972 A | 10/2020 |
| JP | 20071197122 A | 8/2007 |
| JP | 2017007861 A | 1/2017 |
| JP | 2018115040 A | 7/2018 |
| JP | 2020007117 A | 1/2020 |
| KR | 20170094103 A | 8/2017 |
| KR | 2019104933 A | 9/2019 |

OTHER PUBLICATIONS

First Japanese Office Action; Appln. No. JP2022-580875; drafted Feb. 27, 2024.
Korean Notice of Preliminary Rejection dated Dec. 24, 2024; Appln. No. 10-2023-7000765.
The third office action of CN202010625414.9.

* cited by examiner

MATERIAL INVENTORY COUNTING METHOD AND APPARATUS, WAREHOUSING ROBOT, AND WAREHOUSING SYSTEM

CROSS-REFERENCE TO RELATED APPLICATIONS

The present disclosure is a continuation of International Patent Application No. PCT/CN2021/099233 filed on Jun. 9, 2021, which claims priority to Chinese Patent Application No. 202010625414.9, filed with the China National Intellectual Property Administration on Jul. 2, 2020, and entitled "MATERIAL INVENTORY COUNTING METHOD AND APPARATUS, WAREHOUSING ROBOT, AND WAREHOUSING SYSTEM", which is incorporated herein by reference in its entirety.

TECHNICAL FIELD

The present disclosure relates to the technical field of intelligent warehousing, and in particular, to a material inventory counting method and apparatus, a warehousing robot, and a warehousing system.

BACKGROUND

A warehousing robot-based warehousing system uses an intelligent operating system, and implements automated retrieval and storage of items through system instructions. In addition, the system can operate 24 hours a day without interruption to replace manual management and operating, and thus improves the efficiency of warehousing and has been widely used and favored.

In daily operating of the warehousing system, periodic inventory counting needs to be conducted on materials in a warehouse. In existing inventory counting methods, items in shelf zones need to be dispatched and transported into human-robot interaction workstations manually or by warehousing robots, to implement inventory counting on materials in packing boxes by related staff, in which case the inventory counting costs a long time and has low efficiency.

SUMMARY

Embodiments of the present disclosure provide a material inventory counting method and apparatus, a warehousing robot, and a warehousing system, to implement automatic material inventory counting by a warehousing robot in a shelf zone, improve the efficiency of inventory counting, and lower the inventory counting cost.

According to the first aspect, the embodiments of the present disclosure provide a material inventory counting method. The material inventory counting method is applied to the warehousing robot. The method includes: capturing an inventory counting image of a target box through the warehousing robot; and determining an inventory count of a material in the target box according to the inventory counting image.

Optionally, the target box includes a set number of storage cells, and the determining an inventory count of a material in the target box according to the inventory counting image includes: identifying a storage condition of each of the storage cells according to the inventory counting image; and determining the inventory count of the material in the target box according to the storage condition of each of the storage cells.

Optionally, the identifying a storage condition of each of the storage cells according to the inventory counting image includes: identifying, according to the inventory counting image, whether each of the storage cells stores the material; and accordingly, the determining the inventory count of the material in the target box according to the storage condition of each of the storage cells includes: determining the inventory count of the material in the target box according to the number of storage cells having the material stored therein.

Optionally, the determining the inventory count of the material in the target box according to the number of storage cells having the material stored therein includes: acquiring a cell storage count of the material in each of the storage cells; and determining the inventory count of the material in the target box according to the cell storage count corresponding to each of the storage cells having the material stored therein.

Optionally, the warehousing robot includes a visual sensor, and the capturing an inventory counting image of a target box through the warehousing robot includes: capturing the inventory counting image of the target box through the visual sensor of the warehousing robot.

Optionally, the visual sensor is arranged at the top of the warehousing robot, and the capturing the inventory counting image of the target box through the visual sensor of the warehousing robot includes: retrieving the target box by a retrieval apparatus of the warehousing robot in a case that the warehousing robot moves to a target location of the target box and the retrieval apparatus of the warehousing robot moves to a set height; and capturing the inventory counting image of the retrieved target box through the visual sensor.

Optionally, before the capturing the inventory counting image of the retrieved target box through the visual sensor, the method further includes: determining an inventory counting light source of the visual sensor according to the height of the target box; and turning on the inventory counting light source.

Optionally, the visual sensor is arranged on a retrieval apparatus of the warehousing robot, and the capturing the inventory counting image of the target box through the visual sensor of the warehousing robot includes: capturing the inventory counting image of the target box through the visual sensor in a case that the warehousing robot moves to a target location of the target box and the retrieval apparatus of the warehousing robot moves to a set location of the target box.

Optionally, before the warehousing robot moves to the target location of the target box, the method further includes: determining the target box and the target location of the target box according to inventory counting task information; determining the warehousing robot for performing inventory counting on the target box; and generating an inventory counting instruction for the warehousing robot according to the warehousing robot, the target box and the target location of the target box, to control, according to the inventory counting instruction, the warehousing robot to move to the target location of the target box.

Optionally, a material identification code is arranged on the material in the target box, an identification pattern of the material identification code is generated according to the type and the count of the material in the target box, and the capturing an inventory counting image of a target box through the warehousing robot includes: capturing an inventory counting image of the material identification code on the material in the target box through the warehousing robot; and accordingly, the determining an inventory count of a material in the target box according to the inventory counting image includes: identifying the inventory counting image of the material identification code; and determining the inventory counting type and the inventory count of the material in the target box according to an identification result.

Optionally, the material identification code includes at least one of a QR code, a bar code or an electronic tag.

Optionally, the material inventory counting method further includes: determining the inventory counting type of the material according to the inventory counting image.

Optionally, the material inventory counting method further includes: acquiring preset storage information on the target box, where the preset storage information includes at least one of a preset type and a preset count of the material stored in the target box; and performing storage verification on the target box according to at least one of a first matching result between the preset type and the inventory counting type of the material in the target box and a second matching result between the preset count and the inventory count of the material in the target box, and generating a verification report.

Optionally, the material inventory counting method further includes: generating identification failure prompt information in a case that the inventory count of the material in the target box fails to be determined according to the inventory counting image.

According to the second aspect, the embodiments of the present disclosure further provide a material inventory counting method. The method is applied to a warehouse management device. The method includes: acquiring an inventory counting image of a target box captured through a warehousing robot; and determining an inventory count of a material in the target box according to the inventory counting image.

Optionally, the target box includes a set number of storage cells, and the determining an inventory count of a material in the target box according to the inventory counting image includes: identifying a storage condition of each of the storage cells according to the inventory counting image; and determining the inventory count of the material in the target box according to the storage condition of each of the storage cells.

Optionally, the identifying a storage condition of each of the storage cells according to the inventory counting image includes: identifying, according to the inventory counting image, whether each of the storage cells stores the material; and accordingly, the determining the inventory count of the material in the target box according to the storage condition of each of the storage cells includes: determining the inventory count of the material in the target box according to the number of storage cells having the material stored therein.

Optionally, the determining the inventory count of the material in the target box according to the number of storage cells having the material stored therein includes: acquiring a cell storage count of the material in each of the storage cells; and determining the inventory count of the material in the target box according to the cell storage count corresponding to each of the storage cells having the material stored therein.

Optionally, before the acquiring an inventory counting image of a target box captured through a warehousing robot, the method further includes: determining the target box and a target location of the target box according to inventory counting task information; determining the warehousing robot for performing inventory counting on the target box; generating an inventory counting instruction for the warehousing robot according to the warehousing robot, the target box and the target location of the target box, to control, according to the inventory counting instruction, the warehousing robot to move to the target location of the target box; and generating an inventory counting image capturing instruction in response to determining that the warehousing robot arrives at the target location, to control, according to the inventory counting image capturing instruction, the warehousing robot to capture the inventory counting image of the target box.

Optionally, the acquiring an inventory counting image of a target box captured through a warehousing robot includes: capturing the inventory counting image of the target box captured through a visual sensor of the warehousing robot.

Optionally, the acquiring an inventory counting image of a target box captured through a warehousing robot includes: acquiring an inventory counting image for a material identification code on the material in the target box captured through the warehousing robot, where an identification pattern of the material identification code is generated according to the type and the count of the material in the target box; and accordingly, the determining an inventory count of a material in the target box according to the inventory counting image includes: identifying the inventory counting image of the material identification code; and determining the inventory counting type and the inventory count of the material in the target box according to an identification result.

Optionally, the material inventory counting method further includes: determining the inventory counting type of the material according to the inventory counting image.

Optionally, the material inventory counting method further includes: acquiring preset storage information on the target box, where the preset storage information includes at least one of a preset type and a preset count of the material stored in the target box; and performing storage verification on the target box according to at least one of a first matching result between the preset type and the inventory counting type of the material in the target box and a second matching result between the preset count and the inventory count of the material in the target box, and generating a verification report.

Optionally, the material inventory counting method further includes: generating identification failure prompt information in a case that the inventory count of the material in the target box fails to be determined according to the inventory counting image.

According to the third aspect, the embodiments of the present disclosure further provide a material inventory counting apparatus. The apparatus includes: a first inventory counting image acquiring module, configured to capture an inventory counting image of a target box through a warehousing robot; and a first inventory count determining module, configured to determine an inventory count of a material in the target box according to the inventory counting image.

Optionally, the target box includes a set number of storage cells, and the first inventory count determining module includes:

a storage condition identifying unit, configured to identify a storage condition of each of the storage cells according to the inventory counting image; and an inventory count determining unit, configured to determine the inventory count of the material in the target box according to the storage condition of each of the storage cells.

Optionally, the storage condition identifying unit is further configured to:

identify, according to the inventory counting image, whether each of the storage cells stores the material.

Accordingly, the inventory count determining unit is further configured to:

determine the inventory count of the material in the target box according to the number of storage cells having the material stored therein.

Optionally, the inventory count determining unit is further configured to:

acquire a cell storage count of the material in each of the storage cells; and determine the inventory count of the material in the target box according to the cell storage count corresponding to each of the storage cells having the material stored therein.

Optionally, the warehousing robot includes a visual sensor, and the first inventory counting image acquiring module is further configured to:

capture the inventory counting image of the target box through the visual sensor of the warehousing robot.

Optionally, the visual sensor is arranged at the top of the warehousing robot, and the first inventory counting image acquiring module includes:

a target box retrieving unit, configured to retrieve the target box by a retrieval apparatus of the warehousing robot in a case that the warehousing robot moves to a target location of the target box and the retrieval apparatus of the warehousing robot moves to a set height; and a first inventory counting image capturing unit, configured to capture the inventory counting image of the retrieved target box through the visual sensor.

Optionally, the material inventory counting apparatus further includes:

a light source turn-on module, configured to, before the capturing the inventory counting image of the retrieved target box through the visual sensor, determine an inventory counting light source of the visual sensor according to the height of the target box; and turn on the inventory counting light source.

Optionally, the visual sensor is arranged on the retrieval apparatus of the warehousing robot, and the first inventory counting image acquiring module is further configured to:

capture the inventory counting image of the target box through the visual sensor in a case that the warehousing robot moves to a target location of the target box and the retrieval apparatus of the warehousing robot moves to a set location of the target box.

Optionally, the material inventory counting apparatus further includes:

a target location determining module, configured to, before the warehousing robot moves to the target location of the target box, determine the target box and the target location of the target box according to inventory counting task information; a robot determining module, configured to determine the warehousing robot for performing inventory counting on the target box; and an inventory counting instruction generating module, configured to generate an inventory counting instruction for the warehousing robot according to the warehousing robot, the target box and the target location of the target box, to control, according to the inventory counting instruction, the warehousing robot to move to the target location of the target box.

Optionally, a material identification code is arranged on the material in the target box, an identification pattern of the material identification code is generated according to the type and the count of the material in the target box, and the first inventory counting image acquiring module is further configured to: capture an inventory counting image of the material identification code on the material in the target box through the warehousing robot; and accordingly, the first inventory count determining module is further configured to: identify the inventory counting image of the material identification code; and determine the inventory counting type and the inventory count of the material in the target box according to an identification result.

Optionally, the material inventory counting apparatus further includes:

an inventory counting type determining module, configured to determine the inventory counting type of the material according to the inventory counting image.

Optionally, the material inventory counting apparatus further includes:

a preset storage information acquiring module, configured to acquire preset storage information on the target box, where the preset storage information includes at least one of a preset type and a preset count of the material stored in the target box; and an inventory counting information matching module, configured to perform storage verification on the target box according to at least one of a first matching result between the preset type and the inventory counting type of the material in the target box and a second matching result between the preset count and the inventory count of the material in the target box, and generate a verification report.

Optionally, the material inventory counting apparatus further includes:

an identification failure promoting module, configured to generate identification failure prompt information in a case that the inventory count of the material in the target box fails to be determined according to the inventory counting image.

According to the fourth aspect, the embodiments of the present disclosure further provide a material inventory counting apparatus. The apparatus includes: a second inventory counting image acquiring module, configured to acquire an inventory counting image of a target box captured through a warehousing robot; and a second inventory count determining module, configured to determine an inventory count of a material in the target box according to the inventory counting image.

Optionally, the target box includes a set number of storage cells, and the second inventory count determining module includes:

a storage cell identifying unit, configured to identify a storage condition of each of the storage cells according to the inventory counting image; and a second inventory count determining unit, configured to determine the inventory count of the material in the target box according to the storage condition of each of the storage cells.

Optionally, the storage cell identifying unit is further configured to:

identify, according to the inventory counting image, whether each of the storage cells stores the material.

Accordingly, the second inventory count determining unit is further configured to: determine the inventory count of the material in the target box according to the number of storage cells having the material stored therein.

Optionally, the second inventory count determining unit is further configured to: acquire a cell storage count of the material in each of the storage cells; and determine the inventory count of the material in the target box according to the cell storage count corresponding to each of the storage cells having the material stored therein.

Optionally, the material inventory counting apparatus further includes:

an inventory counting instruction determining module, configured to, before the acquiring an inventory counting image of a target box captured through a warehousing robot, determine the target box and a target location of the target box according to inventory counting task information; determine the warehousing robot for performing inventory counting on the target box; and generate an inventory counting instruction for the warehousing robot according to the warehousing robot, the target box and the target location of the target box, to control, according to the inventory counting instruction, the warehousing robot to move to the target location of the target box; and a capturing instruction generating module, configured to generate an inventory counting image capturing instruction in response to determining that the warehousing robot arrives at the target location, to control, according to the inventory counting image capturing instruction, the warehousing robot to capture the inventory counting image of the target box.

Optionally, the second inventory counting image acquiring module is further configured to:

acquire the inventory counting image of the target box captured through a visual sensor of the warehousing robot.

Optionally, the second inventory counting image acquiring module is further configured to:

acquire an inventory counting image for a material identification code on the material in the target box captured through the warehousing robot, where an identification pattern of the material identification code is generated according to the type and the count of the material in the target box; and accordingly, the determining an inventory count of a material in the target box according to the inventory counting image includes: identifying the inventory counting image of the material identification code; and determining the inventory counting type and the inventory count of the material in the target box according to an identification result.

Optionally, the material inventory counting apparatus further includes:

a second inventory counting type determining module, configured to determine the inventory counting type of the material according to the inventory counting image.

Optionally, the material inventory counting apparatus further includes:

a verification report generating module, configured to acquire preset storage information on the target box, where the preset storage information includes at least one of the preset type and the preset count of the material stored in the target box; and perform storage verification on the target box according to at least one of a first matching result between the preset type and the inventory counting type of the material in the target box and a second matching result between the preset count and the inventory count of the material in the target box, and generate a verification report.

Optionally, the material inventory counting apparatus further includes:

a second identification failure promoting module, configured to generate identification failure prompt information in a case that the inventory count of the material in the target box fails to be determined according to the inventory counting image.

According to the fifth aspect, the embodiments of the present disclosure further provide a warehousing robot, including a memory, a processor, and a computer program, where the computer program is stored in the memory, and configured to be executed by the processor to implement the material inventory counting method provided in any embodiment corresponding to the first aspect of the present disclosure.

According to the sixth aspect, the embodiments of the present disclosure further provide a warehouse management device, including a memory, a processor, and a computer program, where the computer program is stored in the memory, and configured to be executed by the processor to implement the material inventory counting method provided in any embodiment corresponding to the second aspect of the present disclosure.

According to the seventh aspect, the embodiments of the present disclosure further provide a warehousing system, including: the warehousing robot provided in the embodiments corresponding to the fifth aspect of the present disclosure, a shelf, and a warehouse management device, where the warehousing robot is connected to the warehouse management device, and configured to move to a target location of a target box according to an instruction of the warehouse management device and perform inventory counting for a material in the target box, where the target box is placed on the shelf.

According to the eighth aspect, the embodiments of the present disclosure further provide a warehousing system, including a warehousing robot, a shelf, and the warehouse management device provided in the embodiments corresponding to the sixth aspect of the present disclosure, where the warehousing robot is connected to the warehouse management device, and configured to move to a target location of a target box according to an instruction of the warehouse management device and capture an inventory counting image of the target box, where the target box is placed on the shelf; and the warehouse management device is configured to receive the inventory counting image, and perform inventory counting for a material in the target box according to the inventory counting image.

According to the ninth aspect, the present disclosure further provides a computer-readable storage medium, where the computer-readable storage medium stores computer-executable instructions, and when executed by a processor, the computer-executable instructions are used for implementing the material inventory counting method provided in any embodiment corresponding to the first aspect of the present disclosure or provided in any embodiment corresponding to the second aspect.

According to the material inventory counting method and apparatus, the warehousing robot, and the warehousing system provided in the embodiments of the present disclosure, an inventory counting image of a target box is captured through the warehousing robot, and a count for a material in the target box is automatically determined according to the inventory counting image, to implement automatic inventory counting for the material, without the need for cross-zone movement of the box, such that the efficiency of inventory counting is greatly improved and the cost of inventory counting is lowered.

BRIEF DESCRIPTION OF THE DRAWINGS

The accompanying drawings here, which are incorporated into the specification and constitute a part of the specification, illustrate embodiments that conform to the present disclosure and are used together with the specification to explain the principles of the present disclosure.

The foregoing drawings have shown clear embodiments of the present disclosure, which will be described in more detail hereinafter. The drawings and test descriptions are not intended to limit the scope of the concept of the present disclosure in any way, but to illustrate the concept of the present disclosure to a person skilled in the art by referring to specific embodiments.

DETAILED DESCRIPTION

Exemplary embodiments will be described here in detail, and examples thereof are represented in the accompanying drawings. When the following description relates to the accompanying drawings, unless otherwise indicated, the same numbers in different accompanying drawings represent the same or similar elements. The implementations described in the following exemplary embodiments do not represent all implementations consistent with the present disclosure. On the contrary, they are merely examples of apparatuses and methods consistent with some aspects of the present disclosure as detailed in the appended claims.

The technical solutions of the present disclosure and how the technical solutions of the present disclosure solve the technical problems will be described in detail below with specific embodiments. The following specific embodiments may be combined with each other, and the same or similar concepts or processes may not be described in some embodiments. Embodiments of the present disclosure will be described below with reference to the accompanying drawings.

Application scenarios of the embodiments of the present disclosure are described below.

Figure 1:
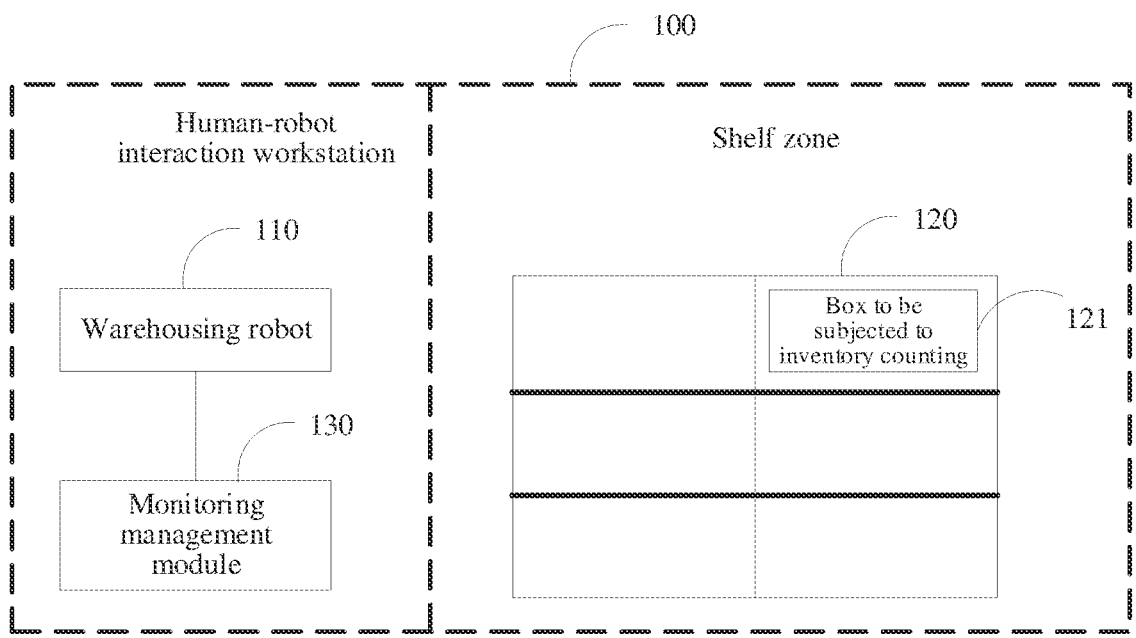
FIG. 1 is an application scenario diagram of a material inventory counting method provided in embodiments of the present disclosure.

FIG. 1 is an application scenario diagram of a material inventory counting method provided in embodiments of the present disclosure. As shown in FIG. 1, during material inventory counting, an intelligent warehousing system 100 controls a warehousing robot 110 to retrieve a box 121 to be subjected to inventory counting on a shelf 120 in a shelf zone, and move the warehousing robot into a human-robot interaction workstation 130 (also known as a manual operating zone), and then an operator of the human-robot interaction workstation 130 performs inventory counting for a material in the box 121 to be subjected to inventory counting. Due to the limited number of warehousing robots and complex steps required for turnover and transport of boxes, the inventory counting takes a long time and has low efficiency.

To solve the problem, in the material inventory counting method provided in the embodiments of the present disclosure, a box image is captured based on a warehousing robot, and the image is identified to automatically determine a count for a material in the box, such that in-situ and automatic inventory counting for the material is implemented and the inventory counting efficiency is improved.

Figure 2:
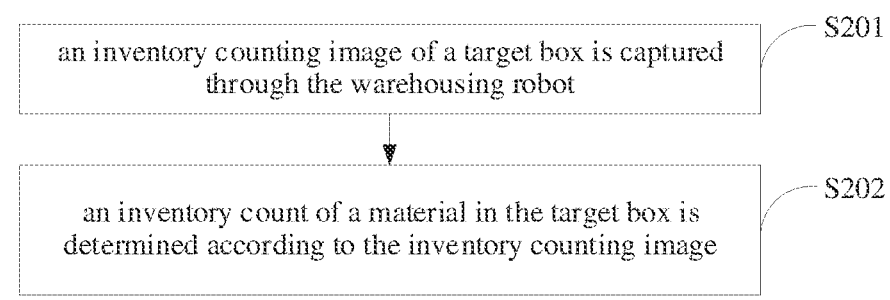
FIG. 2 is a flowchart of a material inventory counting method provided in one embodiment of the present disclosure.

FIG. 2 is a flowchart of a material inventory counting method provided in one embodiment of the present disclosure. The material inventory counting method is applied to a warehousing robot. As shown in FIG. 2, the material inventory counting method provided in this embodiment includes the following steps:

Step S201: an inventory counting image of a target box is captured through the warehousing robot.

One or more target boxes may be arranged, for example, the number of target boxes may be 2, 3, 10, etc. The target box may be an open framed box, i.e., a rectangular box not having an upper surface. The inventory counting image refers to an image captured through the warehousing robot and configured to perform inventory counting for a material in the target box, may be a color image, a black and white image, point cloud data, etc., or may further be a video.

Specifically, when more than one target boxes, i.e., at least two target boxes, are arranged, the warehousing robot captures the inventory counting images corresponding to the target boxes.

Specifically, the target box may refer to any one or more boxes placed on a shelf.

Further, the inventory counting image of the target box may be captured through the warehousing robot according to an inventory counting instruction. The inventory counting instruction may include information on the target box, such as location information and identification information. The location information may be a number of a storage location, a serial number of the storage location, coordinates of storage location or the like. The identification information is ID information of the target box and may be a box serial number. The inventory counting instruction may be input manually, or may be issued by a processor of a warehousing system.

Obviously, before the inventory counting image is captured, the warehousing robot may further be moved, according to a related control instruction, to a target location of the target box, to facilitate capturing the inventory counting image in correspondence to the target box.

Step S202: an inventory count of a material in the target box is determined according to the inventory counting image.

The inventory count refers to a total count of the material in the target box. The material may be any item, such as a piece of clothing, a building material, a decoration, a paper product or other articles. The material may be placed in the target box in a set arrangement, such as in bales or piles.

Specifically, when the inventory counting image includes an identification code of the target box, the inventory count of the material in the target box can be obtained by identifying the identification code. The identification code can be arranged on the target box, such as a set surface of the target box, which is generally the surface facing the warehousing robot, or the bottom surface or a side surface. When the identification code is arranged on the bottom surface, the inventory counting image corresponding to the target box can be acquired by retrieving and moving the target box, to determine the inventory count of the material in the target box according to the inventory counting image.

Specifically, the inventory count of the material in the target box can be determined according to the inventory counting image based on an image identification algorithm. For example, said algorithm may be an image matching algorithm, in which case the material is subjected to feature engineering to determine corresponding material features thereof and then identify the count of the material in the image according to a feature matching algorithm. Said algorithm may also be a neural network algorithm, in which case a material identification neural network can be trained in advance to determine the inventory count of the material according to the network. Alternatively, for materials having different material features, such as materials having different contour features, i.e., for materials of different types, different neural networks are trained in advance to identify and perform inventory counting on said materials, to improve the accuracy of inventory counting.

Exemplarily, the material is placed in bales, and each bale includes a fixed number of materials. Accordingly, the inventory count of the material can be obtained by identifying the number of bales included in the inventory counting image and then multiplying the number of bales by the number of materials in each bale. Obviously, this method is also applicable to materials placed in piles.

According to the material inventory counting method and apparatus, the warehousing robot, and the warehousing system provided in the embodiments of the present disclosure, an inventory counting image of a target box is captured through the warehousing robot, and a count for a material in the target box is automatically determined according to the inventory counting image, to implement automatic inventory counting for the material, without the need for cross-zone movement of the box, such that the efficiency of inventory counting is greatly improved and the cost of inventory counting is lowered.

Figure 3:
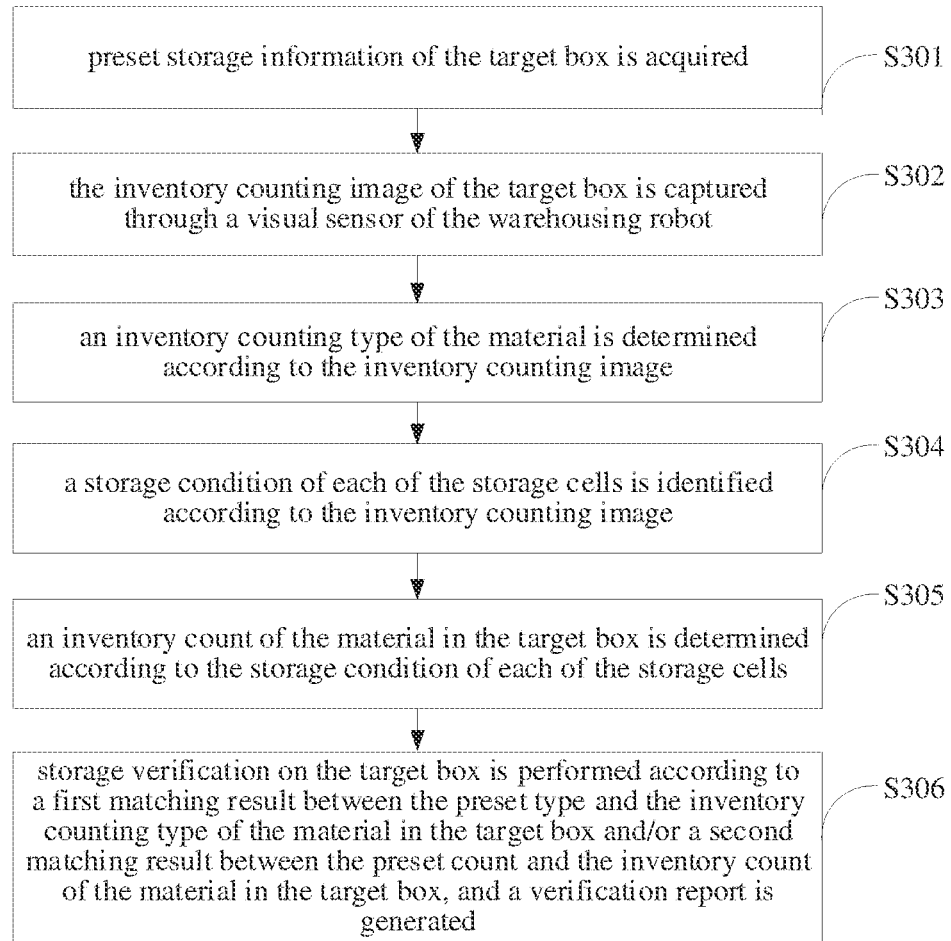
FIG. 3 is a flowchart of a material inventory counting method provided in another embodiment of the present disclosure.

FIG. 3 is a flowchart of a material inventory counting method provided in another embodiment of the present disclosure. The material inventory counting method provided in this embodiment is a further refinement of step S201 and step S202 on the basis of the embodiment shown in FIG. 2, and relates to adding a step of preset storage information acquiring before step S201, and adding a step of inventory counting type determining and a step of inventory counting result matching after step S202. As shown in FIG. 3, the material inventory counting method provided in this embodiment includes the following steps:

Step S301: preset storage information of the target box is acquired.

The preset storage information includes at least one of a preset type and a preset count of the material stored in the target box, and the target box includes a set number of storage cells.

Specifically, the preset count may be 2, 4, 8, 9, or other values, and the sizes of the storage cells may be the same or different. The preset type refers to the preset type of the material placed in the target box, and the preset count refers to the preset count of the material placed in the target box. The preset storage information may be stored in any memory in the warehousing system, and the preset storage information corresponding to the target box is acquired through the identification information of the target box, such as ID information.

Further, the preset type and the preset count may be input into a related memory of the warehousing system during storage of the target box.

Step S302: the inventory counting image of the target box is captured through a visual sensor of the warehousing robot.

The visual sensor of the warehousing robot may be arranged on a retrieval apparatus of the warehousing robot, may be arranged at the top of the warehousing robot, or may be arranged above any storage pallet of the warehousing robot. The visual sensor may be a 2D camera, a depth camera, a laser radar, or the like.

Figure 4:
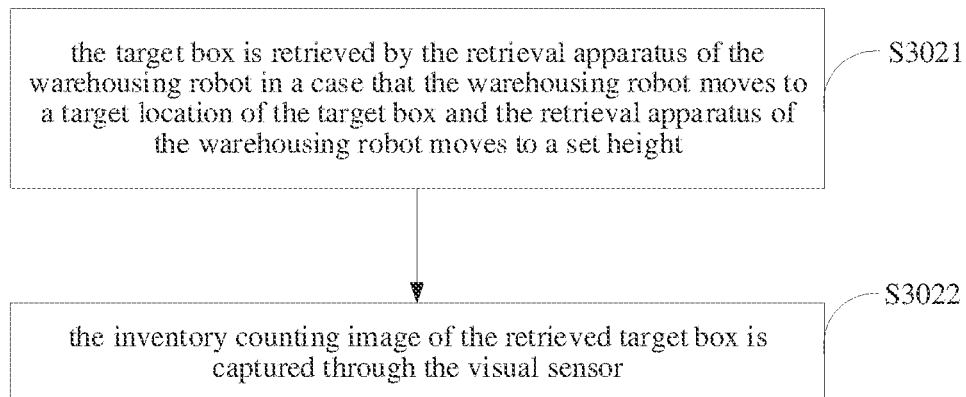
FIG. 4 is a flowchart of step S302 in the embodiment shown in FIG. 3 of the present disclosure.

Optionally, FIG. 4 is a flowchart of step S302 in the embodiment shown in FIG. 3 of the present disclosure. FIG. 4 is directed to the situation where the visual sensor is arranged at the top of the warehousing robot. As shown in FIG. 4, step S302 specifically includes the following steps:

Step S3021: the target box is retrieved by the retrieval apparatus of the warehousing robot in a case that the warehousing robot moves to a target location of the target box and the retrieval apparatus of the warehousing robot moves to a set height.

The target location may be a location corresponding to the target box, such as a location directly in front of or in the left or right front of the target box by a set distance.

Specifically, it is available to move the warehousing robot to the target location of the target box and move the retrieval apparatus of the warehousing robot to the set height according to an instruction issued by a warehouse management device or a processor of the warehousing system. Alternatively, it is also available to move the warehousing robot to the target location of the target box and move the retrieval apparatus of the warehousing robot to the set height according to an instruction input by an operator.

Since the visual sensor is arranged at the top of the warehousing robot and faces the retrieval apparatus, to better capture an image of the target box, it is required to retrieve the target box from the corresponding storage location thereof.

Specifically, the target box can be moved out of the corresponding storage location thereof through the retrieval apparatus of the warehousing robot, such that the visual sensor arranged at the top of the warehousing robot can capture a complete inventory counting image of the target box.

Optionally, before capturing the inventory counting image of the retrieved target box through the visual sensor, the method further includes:

determining an inventory counting light source of the visual sensor according to the height of the target box; and turning on the inventory counting light source.

One or more inventory counting light sources can be provided. When one inventory counting light source is provided, the inventory counting light source can be arranged at the top of the warehousing robot; and when more than one inventory counting light sources are provided, the inventory counting light sources can be respectively arranged at the top of the warehousing robot and the upper end of a basket of each warehousing robot. Before capturing the inventory counting image, all inventory counting light sources may be turned on to supplement light, or only the inventory counting light source at the upper end of the basket corresponding to the target box is turned on, or one or more inventory counting light sources are determined depending on the basket where the target box is placed to supplement light, so as to save energy consumption and improve the definition of the captured inventory counting image.

Step S3022: the inventory counting image of the retrieved target box is captured through the visual sensor.

It may be easily conceived that when the visual sensor is arranged on any storage pallet or the basket of the warehousing robot or on a transverse beam of a cache mechanism, similar to the steps shown in FIG. 4, it is only required to retrieve the target box from a shelf until the target box is located within a field of view of the visual sensor.

Optionally, the visual sensor is arranged on the retrieval apparatus of the warehousing robot, and the capturing the inventory counting image of the target box through the visual sensor of the warehousing robot includes: capturing the inventory counting image of the target box through the visual sensor in a case that the warehousing robot moves to the target location of the target box and the retrieval apparatus of the warehousing robot moves to a set location of the target box.

Figure 5:
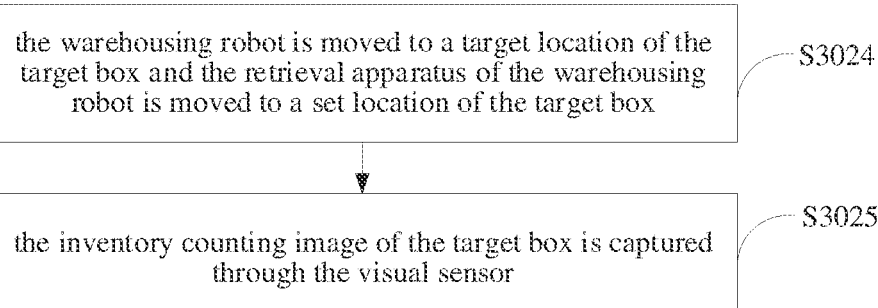
FIG. 5 is a flowchart of step S302 in the embodiment shown in FIG. 3 of the present disclosure.

Optionally, FIG. 5 is a flowchart of step S302 in the embodiment shown in FIG. 3 of the present disclosure. FIG. 5 is directed to the situation where the visual sensor is arranged on the retrieval apparatus of the warehousing robot. As shown in FIG. 5, step S302 specifically includes the following steps:

Step S3024: the warehousing robot is moved to a target location of the target box and the retrieval apparatus of the warehousing robot is moved to a set location of the target box.

The set location may refer to "above" the target box, such as directly above or at the upper right corner of the target box.

Specifically, movement of the retrieval apparatus may include rotation and translation depending on shapes of the retrieval apparatus.

Exemplarily, taking the retrieval apparatus being forks including a left arm and a right arm as an example, the visual sensor may be arranged on one of the arms, such as the left arm or the right arm, such that the forks on which the visual sensor is arranged can be moved to a location above the center of the target box to implement subsequent image capturing.

When the sensor is arranged on the retrieval apparatus, the same inventory counting image can be captured without the need to retrieve the target box from the storage location, such that the efficiency of inventory counting is further improved.

Step S3025: the inventory counting image of the target box is captured through the visual sensor.

Optionally, before the warehousing robot moves to the target location of the target box, the method further includes: determining the target box and the target location of the target box according to inventory counting task information; determining the warehousing robot for performing inventory counting on the target box; and generating an inventory counting instruction for the warehousing robot according to the warehousing robot, the target box and the target location of the target box, to control, according to the inventory counting instruction, the warehousing robot to move to the target location of the target box.

Step S303: an inventory counting type of the material is determined according to the inventory counting image.

The inventory counting type refers to the type of the material determined by the warehousing robot according to the inventory counting image.

Specifically, the inventory counting type of the material placed in the target box can be determined by performing feature extraction on the inventory counting image, or the inventory counting type of the material placed in the target box can be determined based on a preset material identification algorithm.

Step S304: a storage condition of each of the storage cells is identified according to the inventory counting image.

Specifically, the storage condition refers to whether the storage cell stores the material, and may further refer to the count of the material stored in each storage cell.

Specifically, image segmentation can be performed on the inventory counting image to obtain inventory counting sub-images corresponding to the storage cells, so as to determine, according to an average value of gray scale values of the inventory counting sub-images, whether each storage cell stores the material.

Further, according to contour features of the material placed in the storage cells, identification of the contour features can be performed on the inventory counting image to determine the storage condition of each of the storage cells.

Step S305: an inventory count of the material in the target box is determined according to the storage condition of each of the storage cells.

Specifically, the counts for the material stored in the storage cells are added, such that the inventory count of the material in the target box can be determined.

Optionally, the identifying a storage condition of each of the storage cells according to the inventory counting image includes: identifying, according to the inventory counting image, whether each of the storage cells stores the material; and accordingly, the determining an inventory count of the material in the target box according to the storage condition of each of the storage cells includes: determining the inventory count of the material in the target box according to the number of storage cells having the material stored therein.

Specifically, the storage cells of the target box may store the same number of materials, such that the inventory count of the material in the target box can be determined according to the number of the storage cells having the material stored therein.

Optionally, the determining the inventory count of the material in the target box according to the number of storage cells having the material stored therein includes: acquiring a cell storage count of the material in each of the storage cells; and determining the inventory count of the material in the target box according to the cell storage count corresponding to each of the storage cells having the material stored therein.

Specifically, when the storage cells store different numbers of materials, i.e., when the cell storage counts are not identical, a correspondence between each storage cell and the corresponding cell storage count of the material can be established in advance, and then the cell storage count of the material in each of the storage cells is acquired according to the correspondence. Further, the inventory count of the material in the target box can be determined according to the sum of the cell storage counts corresponding to the storage cells having the material stored therein.

Exemplarily, assuming that the target box has four storage cells a, b, c, and d, the cell storage counts for material A are respectively Na, Nb, Nc, and Nd, and the storage cells a, b, and c store material A, then the expression of the inventory count N for material A in the target box is: N=Na+Nb+Nc.

Step S306: storage verification on the target box is performed according to at least one of a first matching result between the preset type and the inventory counting type of the material in the target box and a second matching result between the preset count and the inventory count of the material in the target box, and a verification report is generated.

Specifically, when the preset type of the material in the target box matches with the inventory counting type, and the preset count matches with the inventory count, that is, when both the first matching result and the second matching result indicate "matched", it indicates that storage verification on the target box succeeds, and the verification success report is generated. However, when at least one of the first matching result and the second matching result does not indicate "matched", it indicates that storage verification on the target box fails, and failure information, such as the material type not matching or the count not matching, is output.

Further, when storage verification fails, the preset type and the preset count can be updated according to the inventory counting type and the inventory count.

Optionally, the method further includes: generating identification failure prompt information in a case that the inventory count of the material in the target box fails to be determined according to the inventory counting image.

In this embodiment, an inventory counting image is captured through a warehousing robot, an inventory counting type of a material and a storage condition of the material in each of storage cells are identified according to the inventory counting image, and then an inventory count of the material is determined according to the storage condition, such that automatic and in situ inventory counting of the material is implemented, the inventory counting efficiency is high, and the speed is high; and storage verification is performed according to matching results between the identified inventory counting type and inventory count and the preset type and count, such that the scientificity of material warehousing management is improved.

Figure 6:
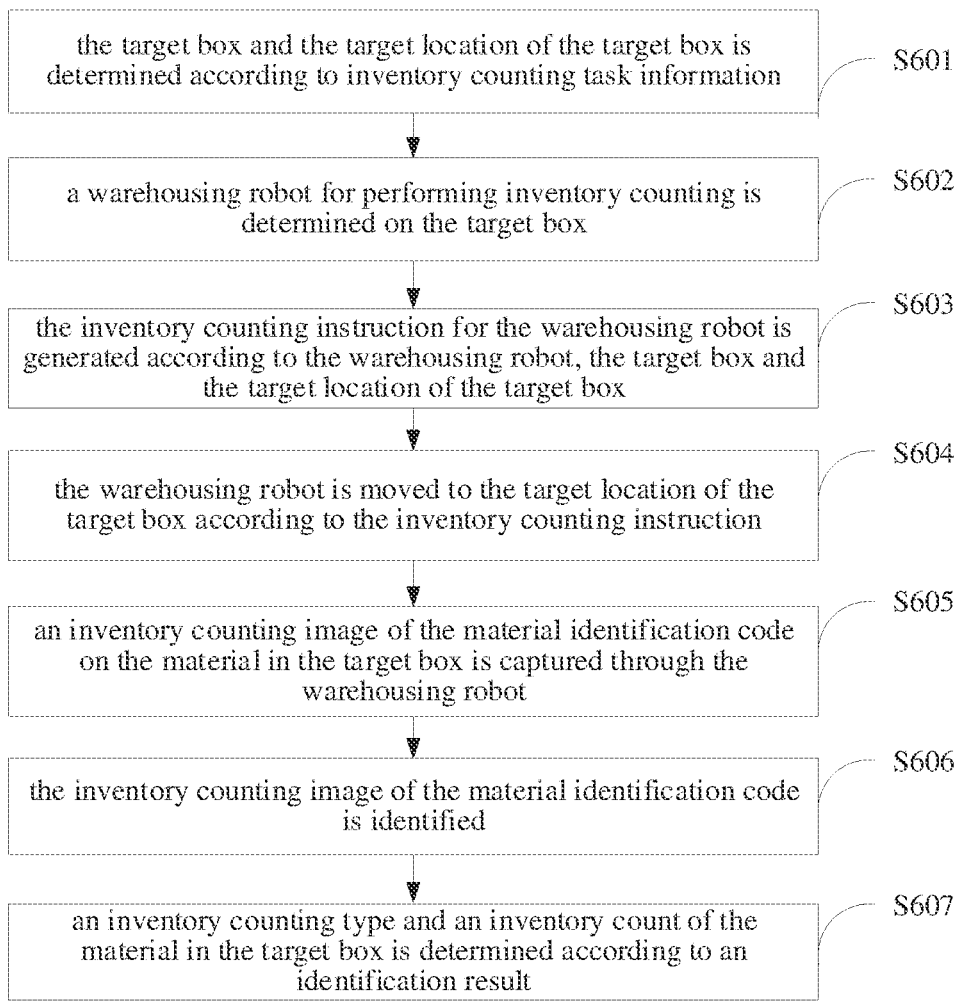
FIG. 6 is a flowchart of a material inventory counting method provided in yet another embodiment of the present disclosure.

FIG. 6 is a flowchart of a material inventory counting method provided in yet another embodiment of the present disclosure. This embodiment is directed to a situation where a material identification code is arranged on the material in the target box. Moreover, on the basis of the embodiment shown in FIG. 2, steps relating to moving the warehousing robot are added before step S201. As shown in FIG. 6, the material inventory counting method includes the following steps:

Step S601: the target box and the target location of the target box is determined according to inventory counting task information.

The inventory counting task information may include identification information of all boxes requiring inventory counting or location information corresponding to storage locations. The target box refers to a box requiring inventory counting, and the location of the target box may be the location of the storage location of the target box or may be identification information of the target box. A material identification code is arranged on the material in the target box; the material identification code may be a QR code, a bar code, an electronic tag, etc.; the material identification code can be arranged on any material in the target box, such as at any location on the upper surface; and the material identification code may be generated according to the type and count of the material in the target box.

Step S602: a warehousing robot for performing inventory counting is determined on the target box.

Generally, an intelligent warehousing system or a warehousing system includes a plurality of warehousing robots, and a suitable warehousing robot can be selected therefrom as a robot for a subsequent task. For example, a warehousing robot can be determined according to an operating state of the warehousing robot, for example, the warehousing state in an idle state or a standby state is selected. The location of the warehousing robot can also be considered, and the closest warehousing robot is selected for inventory counting on the target box.

Specifically, inventory counting robots special for inventory counting can be provided, and a robot in an idle state is selected from the inventory counting robots.

Further, warehousing robots corresponding to target boxes requiring inventory counting can be determined. That is, target boxes corresponding to the warehousing robots used for inventory counting are determined according to the target boxes requiring inventory counting.

Step S603: the inventory counting instruction for the warehousing robot is generated according to the warehousing robot, the target box and the target location of the target box.

The inventory counting instruction may include the target location of each target box and the warehousing robot corresponding to each target box, and may further include an inventory counting order of the target boxes.

Step S604: the warehousing robot is moved to the target location of the target box according to the inventory counting instruction.

Step S605: an inventory counting image of the material identification code on the material in the target box is captured through the warehousing robot.

An identification pattern of the material identification code is generated according to the type and the count of the material in the target box.

The specific process of capturing the inventory counting image is similar to the process in the foregoing embodiments. Depending on the placement location of the material identification code and the arrangement location of a visual sensor, corresponding inventory counting image capturing methods can be used. When the visual sensor is arranged on a body of the warehousing robot, the inventory counting image is captured by retrieving the target box into a basket of the warehousing robot or retrieving the target box out of the shelf. Moreover, for a situation where the visual sensor is arranged at the tail end of a retrieval apparatus, there is no need to retrieve the target box, and the target box can be retained on an original storage location for capturing of the inventory counting image.

Step S606: the inventory counting image of the material identification code is identified.

Specifically, an identification algorithm for the material identification code in the inventory counting image may be a bar code identification algorithm (when the material identification code is the bar code), such as a zbar algorithm, or may be a QR code identification algorithm (when the material identification code is the QR code), such as a Reed Solomon (RS) algorithm, or may be a radio frequency identification-based algorithm (when the material identification code is the electronic tag).

Step S607: an inventory counting type and an inventory count of the material in the target box is determined according to an identification result.

The inventory counting type and the inventory count of the material placed in the target box can be identified by identifying the material identification code of the target box, and then the inventory counting types and the inventory counts corresponding to the target boxes can be collected or counted, thereby completing an entire inventory counting task.

Further, the inventory counting type and the inventory count corresponding to each target box can be respectively compared with a preset type and a preset count of the material placed in said target box stored in the system, and if the results indicate inconsistency, abnormality information is generated according to the comparison results, to remind a relevant operator to verify and correct the inventory count and the inventory counting type of the target box.

Further, when the warehousing robot fails to identify the inventory counting image, for example, a storage cell in the inventory counting image is shielded and there is a stain on the material identification code, identification failure prompt information can be generated to remind the relevant operator that the target box is abnormal.

In this embodiment, a warehousing robot for performing inventory counting is determined through an inventory counting task, and the location of a target box corresponding to a material requiring inventory counting is determined; then an inventory counting instruction is generated to control the warehousing robot to move to the location corresponding to the target box; and an inventory counting image for a material identification code of the target box is captured, to identify the material identification code and determine an inventory counting type and an inventory count of the material, such that the degree of automation of a whole material inventory counting process is improved, the efficiency of inventory counting is improved, and the cost of inventory counting is lowered; in addition, the operating content of the warehousing robot is expanded, and the degree of intelligence of the warehousing robot is improved.

Figure 7:
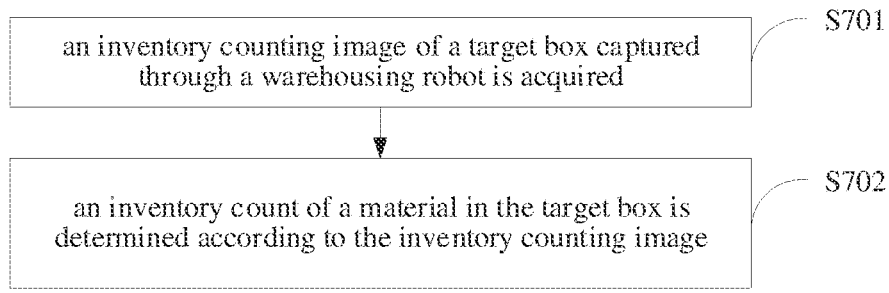
FIG. 7 is a flowchart of a material inventory counting method provided in yet another embodiment of the present disclosure.

FIG. 7 is a flowchart of a material inventory counting method provided in yet another embodiment of the present disclosure. The material inventory counting method provided in this embodiment is applied to a warehouse management device. As shown in FIG. 7, the method includes the following steps:

Step S701: an inventory counting image of a target box captured through a warehousing robot is acquired.

Step S702: an inventory count of a material in the target box is determined according to the inventory counting image.

Optionally, the target box includes a set number of storage cells, and the determining an inventory count of a material in the target box according to the inventory counting image includes:
  identifying a storage condition of each of the storage cells according to the inventory counting image; and determining the inventory count of the material in the target box according to the storage condition of each of the storage cells.

Optionally, the identifying a storage condition of each of the storage cells according to the inventory counting image includes: identifying, according to the inventory counting image, whether each of the storage cells stores the material; and accordingly, the determining the inventory count of the material in the target box according to the storage condition of each of the storage cells includes: determining the inventory count of the material in the target box according to the number of storage cells having the material stored therein.

Optionally, the determining the inventory count of the material in the target box according to the number of storage cells having the material stored therein includes: acquiring a cell storage count of the material in each of the storage cells; and determining the inventory count of the material in the target box according to the cell storage count corresponding to each of the storage cells having the material stored therein.

Optionally, before the acquiring an inventory counting image of a target box captured through a warehousing robot, the method further includes: determining the target box and a target location of the target box according to inventory counting task information; determining the warehousing robot for performing inventory counting on the target box; generating an inventory counting instruction for the warehousing robot according to the warehousing robot, the target box and the target location of the target box, to control, according to the inventory counting instruction, the warehousing robot to move to the target location of the target box; and generating an inventory counting image capturing instruction in response to determining that the warehousing robot arrives at the target location, to control, according to the inventory counting image capturing instruction, the warehousing robot to capture the inventory counting image of the target box.

Optionally, the acquiring an inventory counting image of a target box captured through a warehousing robot includes: capturing the inventory counting image of the target box captured through a visual sensor of the warehousing robot.

Optionally, the acquiring an inventory counting image of a target box captured through a warehousing robot includes: acquiring an inventory counting image for a material identification code on the material in the target box captured through the warehousing robot, where an identification pattern of the material identification code is generated according to the type and the count of the material in the target box; and accordingly, the determining an inventory count of a material in the target box according to the inventory counting image includes: identifying the inventory counting image of the material identification code; and determining the inventory counting type and the inventory count of the material in the target box according to an identification result.

Optionally, the material inventory counting method further includes: determining the inventory counting type of the material according to the inventory counting image.

Optionally, the material inventory counting method further includes: acquiring preset storage information on the target box, where the preset storage information includes at least one of a preset type and a preset count of the material stored in the target box; and performing storage verification on the target box according to at least one of a first matching result between the preset type and the inventory counting type of the material in the target box and a second matching result between the preset count and the inventory count of the material in the target box, and generating a verification report.

Optionally, the material inventory counting method further includes: generating identification failure prompt information in a case that the inventory count of the material in the target box fails to be determined according to the inventory counting image.

Figure 8:
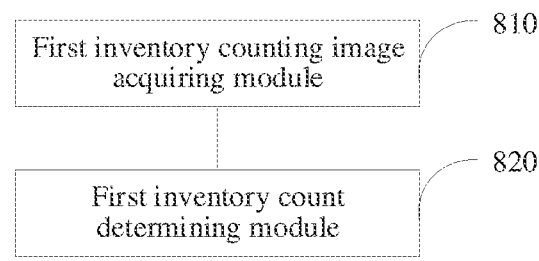
FIG. 8 is a schematic structural diagram of a material inventory counting apparatus provided in one embodiment of the present disclosure.

FIG. 8 is a schematic structural diagram of a material inventory counting apparatus provided in one embodiment of the present disclosure. As shown in FIG. 8, the material inventory counting apparatus includes a first inventory counting image acquiring module 810 and a first inventory count determining module 820.

The first inventory counting image acquiring module 810 is configured to capture an inventory counting image of a target box through a warehousing robot; and the first inventory count determining module 820 is configured to determine an inventory count of a material in the target box according to the inventory counting image.

Optionally, the target box includes a set number of storage cells, and the inventory count determining module 820 includes:

a storage condition identifying unit, configured to identify a storage condition of each of the storage cells according to the inventory counting image; and an inventory count determining unit, configured to determine the inventory count of the material in the target box according to the storage condition of each of the storage cells.

Optionally, the storage condition identifying unit is further configured to: identify, according to the inventory counting image, whether each of the storage cells stores the material.

Accordingly, the inventory count determining unit is further configured to: determine the inventory count of the material in the target box according to the number of storage cells having the material stored therein.

Optionally, the inventory count determining unit is further configured to: acquire a cell storage count of the material in each of the storage cells; and determine the inventory count of the material in the target box according to the cell storage count corresponding to each of the storage cells having the material stored therein.

Optionally, the warehousing robot includes a visual sensor, and the first inventory counting image acquiring module 810 is further configured to: capture the inventory counting image of the target box through the visual sensor of the warehousing robot.

Optionally, the visual sensor is arranged at the top of the warehousing robot, and the first inventory counting image acquiring module 810 includes: a target box retrieving unit, configured to retrieve the target box by a retrieval apparatus of the warehousing robot in a case that the warehousing robot moves to a target location of the target box and the retrieval apparatus of the warehousing robot moves to a set height; and a first inventory counting image capturing unit, configured to capture the inventory counting image of the retrieved target box through the visual sensor.

Optionally, the material inventory counting apparatus further includes: a light source turn-on module, configured to, before the capturing the inventory counting image of the retrieved target box through the visual sensor, determine an inventory counting light source of the visual sensor according to the height of the target box; and turn on the inventory counting light source.

Optionally, the visual sensor is arranged on the retrieval apparatus of the warehousing robot, and the first inventory counting image acquiring module 810 is further configured to: capture the inventory counting image of the retrieved target box through the visual sensor in a case that the warehousing robot moves to the target location of the target box and the retrieval apparatus of the warehousing robot moves to a set location of the target box.

Optionally, the material inventory counting apparatus further includes: a target location determining module, configured to, before the warehousing robot moves to the target location of the target box, determine the target box and the target location of the target box according to inventory counting task information; a robot determining module, configured to determine the warehousing robot for performing inventory counting on the target box; and an inventory counting instruction generating module, configured to generate an inventory counting instruction for the warehousing robot according to the warehousing robot, the target box and the target location of the target box, to control, according to the inventory counting instruction, the warehousing robot to move to the target location of the target box.

Optionally, a material identification code is arranged on the material in the target box, an identification pattern of the material identification code is generated according to the type and the count of the material in the target box, and the first inventory counting image acquiring module 810 is further configured to: capture an inventory counting image of the material identification code on the material in the target box through the warehousing robot; and accordingly, the first inventory count determining module 820 is further configured to: identify the inventory counting image of the material identification code; and determine an inventory counting type and an inventory count of the material in the target box according to an identification result.

Optionally, the material inventory counting apparatus further includes: an inventory counting type determining module, configured to determine the inventory counting type of the material according to the inventory counting image.

Optionally, the material inventory counting apparatus further includes: a preset storage information acquiring module, configured to acquire preset storage information on the target box, where the preset storage information includes at least one of a preset type and a preset count of the material stored in the target box; and an inventory counting information matching module, configured to perform storage verification on the target box according to at least one of a first matching result between the preset type and the inventory counting type of the material in the target box and a second matching result between the preset count and the inventory count of the material in the target box, and generate a verification report.

Optionally, the material inventory counting apparatus further includes: an identification failure promoting module, configured to generate identification failure prompt information in a case that the inventory count of the material in the target box fails to be determined according to the inventory counting image.

Figure 9:
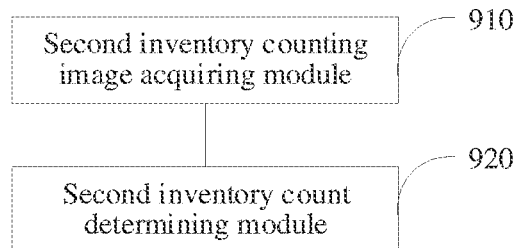
FIG. 9 is a schematic structural diagram of a material inventory counting apparatus provided in another embodiment of the present disclosure.

FIG. 9 is a schematic structural diagram of a material inventory counting apparatus provided in another embodiment of the present disclosure. As shown in FIG. 9, the material inventory counting apparatus includes: a second inventory counting image acquiring module 910 and a second inventory count determining module 920.

The second inventory counting image acquiring module 910 is configured to acquire an inventory counting image of a target box captured through a warehousing robot; and the second inventory count determining module 920 is configured to determine an inventory count of a material in the target box according to the inventory counting image.

Optionally, the target box includes a set number of storage cells, and the second inventory count determining module 920 includes:

a storage cell identifying unit, configured to identify a storage condition of each of the storage cells according to the inventory counting image; and a second inventory count determining unit, configured to determine the inventory count of the material in the target box according to the storage condition of each of the storage cells.

Optionally, the storage cell identifying unit is further configured to: identify, according to the inventory counting image, whether each of the storage cells stores the material.

Accordingly, the second inventory count determining unit is further configured to: determine the inventory count of the material in the target box according to the number of storage cells having the material stored therein.

Optionally, the second inventory count determining unit is further configured to: acquire a cell storage count of the material in each of the storage cells; and determine the inventory count of the material in the target box according to the cell storage count corresponding to each of the storage cells having the material stored therein.

Optionally, the material inventory counting apparatus further includes: an inventory counting instruction determining module, configured to, before the acquiring an inventory counting image of a target box captured through a warehousing robot, determine the target box and a target location of the target box according to inventory counting task information; determine the warehousing robot for performing inventory counting on the target box; and generate an inventory counting instruction for the warehousing robot according to the warehousing robot, the target box and the target location of the target box, to control, according to the inventory counting instruction, the warehousing robot to move to the target location of the target box; and a capturing instruction generating module, configured to generate an inventory counting image capturing instruction in response to determining that the warehousing robot arrives at the target location, to control, according to the inventory counting image capturing instruction, the warehousing robot to capture the inventory counting image of the target box.

Optionally, the second inventory counting image acquiring module 910 is further configured to: acquire the inventory counting image of the target box captured through a visual sensor of the warehousing robot.

Optionally, the second inventory counting image acquiring module 910 is further configured to: acquire an inventory counting image for a material identification code on the material in the target box captured through the warehousing robot, where an identification pattern of the material identification code is generated according to the type and the count of the material in the target box; and accordingly, the determining an inventory count of a material in the target box according to the inventory counting image includes: identifying the inventory counting image of the material identification code; and determining the inventory counting type and the inventory count of the material in the target box according to an identification result.

Optionally, the material inventory counting apparatus further includes: a second inventory counting type determining module, configured to determine the inventory counting type of the material according to the inventory counting image.

Optionally, the material inventory counting apparatus further includes: a verification report generating module, configured to acquire preset storage information on the target box, where the preset storage information includes at least one of the preset type and the preset count of the material stored in the target box; and perform storage verification on the target box according to at least one of a first matching result between the preset type and the inventory counting type of the material in the target box and a second matching result between the preset count and the inventory count of the material in the target box, and generate a verification report.

Optionally, the material inventory counting apparatus further includes: a second identification failure promoting module, configured to generate identification failure prompt information in a case that the inventory count of the material in the target box fails to be determined according to the inventory counting image.

Figure 10:
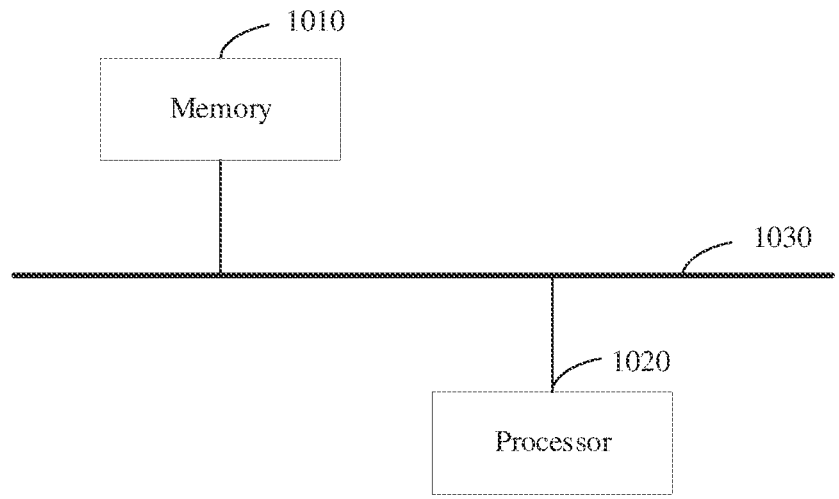
FIG. 10 is a schematic structural diagram of a warehousing robot provided in one embodiment of the present disclosure.

FIG. 10 is a schematic structural diagram of a warehousing robot provided in one embodiment of the present disclosure. As shown in FIG. 10, the warehousing robot includes: a memory 1010, a processor 1020, and a computer program.

The computer program is stored in the memory 1010, and configured to be executed by the processor 1020 to implement the material inventory counting method provided in any one of the embodiments corresponding to FIG. 2 to FIG. 6 of the present disclosure.

The memory 1010 and the processor 1020 are connected to each other through a bus 1030.

Relevant descriptions can be understood by correspondingly referring to the relevant descriptions and effects corresponding to the steps in FIG. 2 to FIG. 6. Details are not repeated here.

Figure 11:
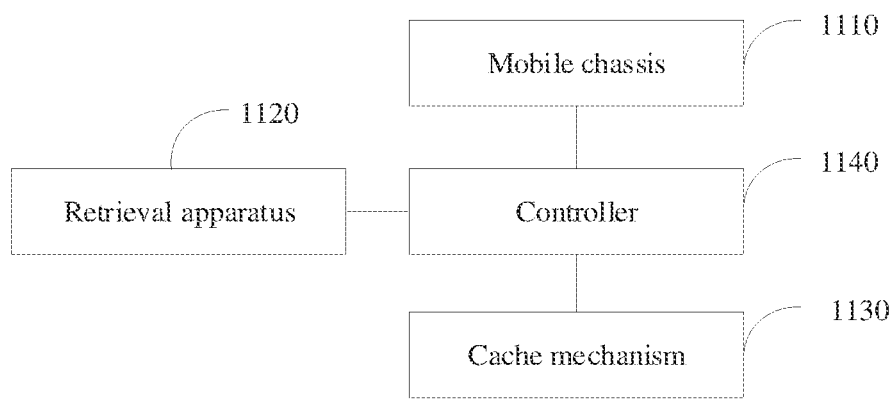
FIG. 11 is a schematic structural diagram of a warehousing robot provided in another embodiment of the present disclosure.

FIG. 11 is a schematic structural diagram of a warehousing robot provided in another embodiment of the present disclosure. As shown in FIG. 11, the warehousing robot includes: a mobile chassis 1110, a retrieval apparatus 1120, a cache mechanism 1130, and a controller 1140.

The cache mechanism 1130 is arranged on the mobile chassis 1110, the retrieval apparatus 1120 is mechanically connected to a storage shelf, and the controller 1140 is separately connected to the mobile chassis 1110 and the retrieval apparatus 1120 and configured to control the mobile chassis 1110 and the retrieval apparatus 1120 to implement the material inventory counting method provided in any embodiment corresponding to FIG. 2 to FIG. 6 of the present disclosure.

Optionally, the warehousing robot further includes a visual sensor, which may be a 2D camera, a depth camera, a laser radar, or the like, can be arranged at the tail end of the retrieval apparatus 1120 or the top of the cache mechanism 1130, and is configured to capture the inventory counting image in the foregoing embodiments.

Optionally, the warehousing robot further includes an inventory counting light source; one or more inventory counting light sources can be provided; when one inventory counting light source is provided, the inventory counting light source can be arranged at the top of the warehousing robot; and when more than one inventory counting light sources are provided, the inventory counting light sources can be respectively arranged at the top of the warehousing robot and the upper end of a basket of each warehousing robot.

Further, the warehousing robot can further be configured to retrieve and storage a target box.

Figure 12:
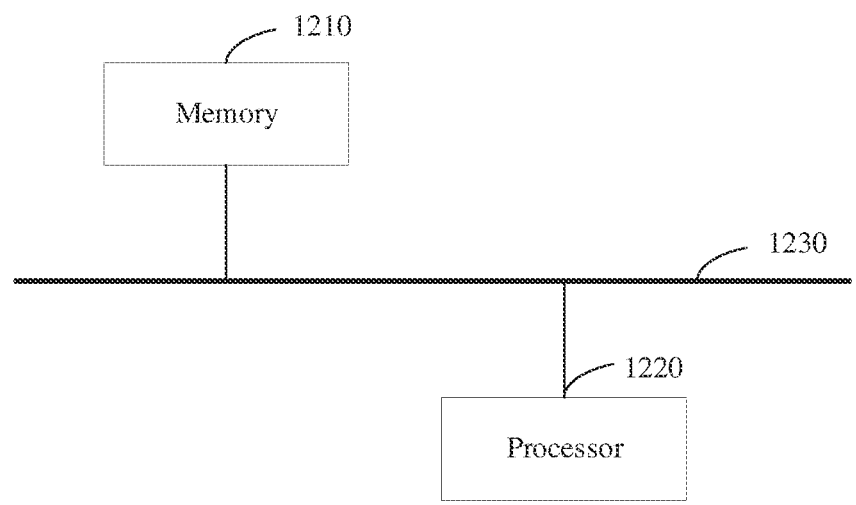
FIG. 12 is a schematic structural diagram of a warehouse management device provided in one embodiment of the present disclosure.

FIG. 12 is a schematic structural diagram of a warehouse management device provided in one embodiment of the present disclosure. As shown in FIG. 12, the warehouse management device includes: a memory 1210, a processor 1220, and a computer program.

The computer program is stored in the memory 1210, and configured to be executed by the processor 1220 to implement the material inventory counting method provided in the embodiment corresponding to FIG. 7 of the present disclosure.

The memory 1210 and the processor 1220 are connected to each other through a bus 1230.

Relevant descriptions can be understood by correspondingly referring to the relevant descriptions and effects corresponding to the steps in FIG. 7. Details are not repeated here.

Figure 13:
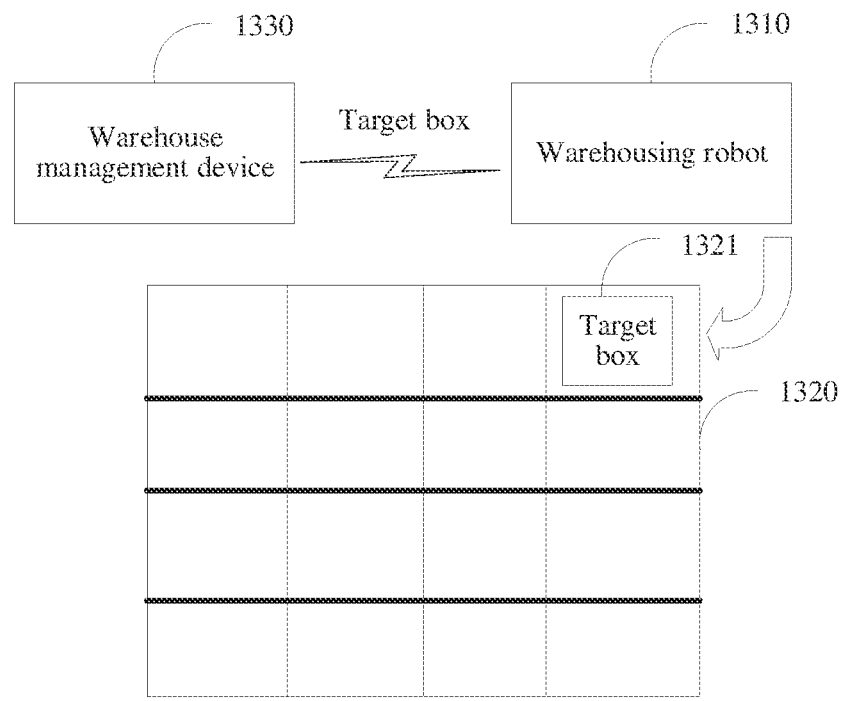
FIG. 13 is a schematic structural diagram of a warehousing system provided in one embodiment of the present disclosure.

FIG. 13 is a schematic structural diagram of a warehousing system provided in one embodiment of the present disclosure. As shown in FIG. 13, the warehousing system includes: a warehousing robot 1310, a shelf 1320, and a warehouse management device 1330.

A target box 1321 is placed on the shelf 1320; the warehousing robot 1310 is the warehousing robot provided in any one of the embodiments corresponding to FIG. 10 and FIG. 11 of the present disclosure; the warehousing robot 1310 is connected to the warehouse management device 1330, and configured to move to a target location of the target box 1321 according to an instruction of the warehouse management device 1330 and perform inventory counting on a material in the target box 1321.

Figure 14:
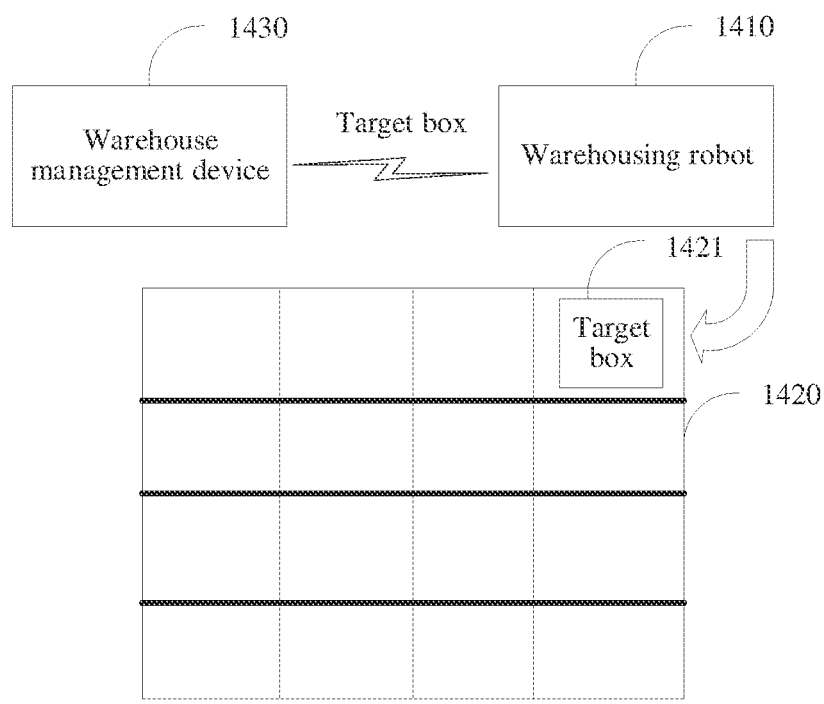
FIG. 14 is a schematic structural diagram of a warehousing system provided in another embodiment of the present disclosure.

FIG. 14 is a schematic structural diagram of a warehousing system provided in one embodiment of the present disclosure. As shown in FIG. 14, the warehousing system includes: a warehousing robot 1410, a shelf 1420, and a warehouse management device 1430.

A target box 1421 is placed on the shelf 1420; the warehousing robot 1410 is the warehousing robot provided in any one of the embodiments corresponding to FIG. 10 and FIG. 11 of the present disclosure; the warehousing robot 1410 is connected to the warehouse management device 1430, and configured to move to a target location of the target box 1421 according to an instruction of the warehouse management device 1430 and capture an inventory counting image of the target box 1421; the warehouse management device 1430 is the warehouse management device in the embodiment shown in FIG. 12 of the present disclosure, and configured to receive the inventory counting image and perform inventory counting on a material in the target box 1421 according to the inventory counting image.

One embodiment of the present disclosure provides a computer-readable storage medium, having a computer program stored thereon, where the computer program is executed by a processor to implement the material inventory counting method provided in any one of the embodiments corresponding to FIG. 2 to FIG. 7 of the present disclosure.

The computer-readable storage medium may be a ROM, a random access memory (RAM), a CO-RAM, a magnetic tape, a soft disk, an optical data storage device, etc.

The disclosed apparatus and method in the embodiments provided in the present disclosure may be implemented by other modes. For example, the apparatus embodiments described above are merely exemplary. For example, module division is merely logical function division and may be other division in actual implementation. For example, a plurality of module or components may be combined or integrated into another system, or some features may be ignored or not performed. In addition, the displayed or discussed mutual couplings or direct couplings or communication connections may be implemented by some interfaces. The indirect couplings or communication connections between the apparatuses or modules may be electrical and mechanical, or in other forms.

A person skilled in the art can easily figure out other implementation solutions of the present disclosure after considering the specification and practicing the disclosure disclosed here. The present disclosure is intended to cover any variations, functions, or adaptive changes of the present disclosure. These variations, functions, or adaptive changes comply with general principles of the present disclosure, and include common general knowledge or common technical means in the art that are not disclosed in the present disclosure. The specification and embodiments are merely considered to be exemplary, and the actual scope and spirit of the present disclosure are pointed out in the following claims.

The present disclosure is not limited to the accurate structures described above and shown in the accompanying drawings, and various modifications and changes may be made without departing from the scope of the present disclosure. The scope of the present disclosure is limited only by the attached claims.

What is claimed is:

1. A material inventory counting method, executed by a warehousing robot comprising a visual sensor and a retrieval apparatus, the visual sensor being arranged at a top of the warehousing robot and being configured to face the retrieval apparatus, and the method comprising:
    capturing an inventory counting image of a target box through the warehousing robot; and
    determining an inventory count of a material in the target box according to the inventory counting image;
    wherein the capturing an inventory counting image of a target box through the warehousing robot comprises:
    retrieving the target box by the retrieval apparatus of the warehousing robot in a case that the warehousing robot moves to a target location of the target box and the retrieval apparatus of the warehousing robot moves to a set height; and
    capturing the inventory counting image of the retrieved target box through the visual sensor.

2. The method according to claim 1, wherein the target box comprises a set number of storage cells, and the determining an inventory count of a material in the target box according to the inventory counting image comprises:
    identifying a storage condition of each of the storage cells according to the inventory counting image; and
    determining the inventory count of the material in the target box according to the storage condition of each of the storage cells.

3. The method according to claim 2, wherein the identifying a storage condition of each of the storage cells according to the inventory counting image comprises:
    identifying, according to the inventory counting image, whether each of the storage cells stores the material; and
    accordingly, the determining the inventory count of the material in the target box according to the storage condition of each of the storage cells comprises:
    determining the inventory count of the material in the target box according to the number of storage cells having the material stored therein.

4. The method according to claim 3, wherein the determining the inventory count of the material in the target box according to the number of storage cells having the material stored therein comprises:
    acquiring a cell storage count of the material in each of the storage cells; and determining the inventory count of the material in the target box according to the cell storage count corresponding to each of the storage cells having the material stored therein.

5. The method according to claim 1, wherein before the capturing the inventory counting image of the retrieved target box through the visual sensor, the method further comprises:
determining an inventory counting light source of the visual sensor according to a height of the target box; and
turning on the inventory counting light source.

6. The method according to claim 1, wherein before the warehousing robot moves to the target location of the target box, the method further comprises:
determining the target box and the target location of the target box according to inventory counting task information;
determining the warehousing robot for performing inventory counting on the target box; and
generating an inventory counting instruction for the warehousing robot according to the warehousing robot, the target box and the target location of the target box, to control, according to the inventory counting instruction, the warehousing robot to move to the target location of to the target box.

7. The method according to claim 1, wherein a material identification code is arranged on the material in the target box, an identification pattern of the material identification code is generated according to a type and the count of the material in the target box, and the capturing an inventory counting image of a target box through the warehousing robot comprises:
capturing an inventory counting image of the material identification code on the material in the target box through the warehousing robot; and
accordingly, the determining an inventory count of a material in the target box according to the inventory counting image comprises:
identifying the inventory counting image of the material identification code; and
determining an inventory counting type and the inventory count of the material in the target box according to an identification result.

8. The method according to claim 7, wherein the material identification code comprises at least one of a QR code, a bar code or an electronic tag.

9. The method according to claim 1, further comprising:
determining the inventory counting type of the material according to the inventory counting image.

10. The method according to claim 9, further comprising:
acquiring preset storage information on the target box, wherein the preset storage information comprises at least one of a preset type and a preset count of the material stored in the target box; and
performing storage verification on the target box according to at least one of a first matching result between the preset type and the inventory counting type of the material in the target box, and a second matching result between the preset count and the inventory count of the material in the target box, and generating a verification report.

11. The method according to claim 1, further comprising:
generating identification failure prompt information in a case that the inventory count of the material in the target box fails to be determined according to the inventory counting image.

12. A material inventory counting method, executed by a warehouse management device, and the method comprising:
acquiring an inventory counting image of a target box captured through a warehousing robot; and
determining an inventory count of a material in the target box according to the inventory counting image;
wherein the warehousing robot comprises a visual sensor and a retrieval apparatus, the visual sensor is arranged at a top of the warehousing robot and is configured to face the retrieval apparatus;
wherein the inventory counting image of the target box is captured by the sensor after the target box is retrieved by the retrieval apparatus, and the target box is retrieved by the retrieval apparatus in a case that the warehousing robot moves to a target location of the target box and the retrieval apparatus moves to a set height.

13. The method according to claim 12, wherein the target box comprises a set number of storage cells, and the determining an inventory count of a material in the target box according to the inventory counting image comprises:
identifying a storage condition of each of the storage cells according to the inventory counting image; and
determining the inventory count of the material in the target box according to the storage condition of each of the storage cells.

14. The method according to claim 12, wherein before the acquiring an inventory counting image of a target box captured through a warehousing robot, the method further comprises:
determining the target box and a target location of the target box according to inventory counting task information;
determining the warehousing robot for performing inventory counting on the target box;
generating an inventory counting instruction for the warehousing robot according to the warehousing robot, the target box and the target location of the target box, to control, according to the inventory counting instruction, the warehousing robot to move to the target location of the target box; and
generating an inventory counting image capturing instruction in response to determining that the warehousing robot arrives at the target location, to control, according to the inventory counting image capturing instruction, the warehousing robot to capture the inventory counting image of the target box.

15. A warehousing robot comprising a visual sensor, a retrieval apparatus, a memory, a processor, and a computer program, wherein the visual sensor is arranged at a top of the warehousing robot and is configured to face the retrieval apparatus, the computer program is stored in the memory, and configured to be executed by the processor to:
control the warehouse robot to capture an inventory counting image of a target box; and
determine an inventory count of a material in the target box according to the inventory counting image;
wherein when the processor is configured to executed the computer program to control the warehouse robot to capture the inventory counting image of the target box, the processor is further configured to:
control the retrieval apparatus to retrieve the target box after controlling the warehousing robot to move to a target location of the target box and the retrieval apparatus to move to a set height; and
control the sensor to capture the inventory counting image of the retrieved target box.

16. A warehouse management device comprising a memory, a processor, and a computer program, wherein the computer program is stored in the memory, and configured to be executed by the processor to implement operations of:
acquiring an inventory counting image of a target box captured through a warehousing robot, wherein the warehousing robot comprises a visual sensor and a retrieval apparatus, the visual sensor is arranged at the top of the warehousing robot and is configured to face the retrieval apparatus; and
determining an inventory count of a material in the target box according to the inventory counting image;
wherein the inventory counting image of the target box is captured by the sensor of the warehouse robot after the target box is retrieved by the retrieval apparatus, and the target box is retrieved by the retrieval apparatus in a case that the warehousing robot moves to a target location of the target box and the retrieval apparatus moves to a set height.

17. A warehousing system comprising a warehousing robot, a shelf, and a warehouse management device;
wherein the warehousing robot is connected to the warehouse management device, and configured to move to a target location of a target box according to an instruction of the warehouse management device and capture an inventory counting image of the target box, wherein the target box is placed on the shelf;
the warehouse management device is configured to receive the inventory counting image, and perform inventory counting for a material in the target box according to the inventory counting image;
wherein the warehouse robot comprises a visual sensor and a retrieval apparatus, the visual sensor is arranged at the top of the warehousing robot and is configured to face the retrieval apparatus;
wherein the retrieval apparatus is configured to move to a set height and retrieve the target box from the shelf in a case that the warehousing robot moves to a target location of the target box, and the sensor is configured to capture the inventory counting image of the retrieved target box.

18. A non-transitory computer computer-readable storage medium, wherein the computer-readable storage medium stores computer-executable instructions, and when executed by a processor, the computer-executable instructions are configured to:
control a warehouse robot to capture an inventory counting image of a target box; and determine an inventory count of a material in the target box according to the inventory counting image;
wherein the warehousing robot comprises a visual sensor and a retrieval apparatus, the visual sensor is arranged at a top of the warehousing robot and is configured to face the retrieval apparatus;
wherein when the computer-executable instructions are configured to control the warehouse robot to capture the inventory counting image of the target box, the computer-executable instructions are configured to:
control the retrieval apparatus to retrieve the target box after controlling the warehousing robot to move to a target location of the target box and the retrieval apparatus to move to a set height; and
control the sensor to capture the inventory counting image of the retrieved target box.

\* \* \* \* \*